US008201181B2

(12) United States Patent
Nguyen et al.

(10) Patent No.: US 8,201,181 B2
(45) Date of Patent: Jun. 12, 2012

(54) SYSTEM AND METHOD FOR SENSOR SCHEDULING USING FUZZY COGNITIVE MAPS

(75) Inventors: Duong Nguyen, Denver, CO (US); Michael T. Hampton, Naperville, IL (US); Anthony M. Janoso, Littleton, CO (US)

(73) Assignee: Raytheon Company, Waltham, MA (US)

( * ) Notice: Subject to any disclaimer, the term of this patent is extended or adjusted under 35 U.S.C. 154(b) by 1066 days.

(21) Appl. No.: 11/849,016

(22) Filed: Aug. 31, 2007

(65) Prior Publication Data

US 2009/0064169 A1 Mar. 5, 2009

(51) Int. Cl.
*G06F 9/46* (2006.01)
*G06F 11/00* (2006.01)
(52) U.S. Cl. ............... 718/104; 718/103; 702/188
(58) Field of Classification Search ................. None
See application file for complete search history.

(56) References Cited

U.S. PATENT DOCUMENTS

| 6,801,878 | B1 * | 10/2004 | Hintz et al. | 702/188 |
|---|---|---|---|---|
| 6,842,899 | B2 * | 1/2005 | Moody et al. | 718/100 |
| 2004/0068415 | A1 * | 4/2004 | Solomon | 705/1 |
| 2007/0136264 | A1 * | 6/2007 | Tran | 707/4 |

OTHER PUBLICATIONS

McIntyre, A. Gregory, "A Comprehensive Approach to Sensor Management and Scheduling," published by DTIC in 1998, Accession No. ADA359079.*
Lopez et al, "Fuzzy reasoning for multisensor management", Oct. 22-25, 1995, Systems, Man and Cybernetics, 1995. 'Intelligent Systems for the 21st Century'., IEEE International Conference on, vol. 2, pp. 1398-1403.*
Avasarala Viswanath, Tracy Mullen, David Hall and Amulya Garga, "MASM: a market architecture for sensor management in distributed sensor networks", Proc. SPIE 5813, 281 (2005); doi:10.1117/12.604074.*
D.J. Musliner, R.P. Goldman, and K.D. Krebsbach, "Deliberation scheduling strategies for adaptive mission planning in real-time environments", in Proc. Metacognition in Computation, 2005, pp. 98-105.*
PCT Notification of Transmittal of the International Search Report and the Written Opinion of the International Searching Authority, or the Declaration mailed May 13, 2009, regarding PCT/US2008/074750 filed Aug. 29, 2008 (12 pages), May 13, 2009.
Mullen, Tracy, et al., "Customer-Driven Sensor Management;" Self Managing Systems; IEEE Computer Society, XP007908418; Mar./Apr. 2006; p. 41-49. Perusich, Karl, et al; United States Air Force Research Laboratory; "Understanding and Modeling Information Dominance in Battle Management: Applications of Fuzzy Cognitive Maps;" XP007908419; AFRL-HE-WP-TR-1998-0040; 98 pages, Mar. 1998.

* cited by examiner

*Primary Examiner* — Meng An
*Assistant Examiner* — Bing Zhao
(74) *Attorney, Agent, or Firm* — Schwegman, Lundberg & Woessner, P.A.

(57) ABSTRACT

A system for sensor scheduling includes a plurality of sensors operable to perform one or more tasks and a processor operable to receive one or more missions and one or more environmental conditions associated with a respective mission. Each mission may include one or more tasks to be performed by one or more of the plurality of sensors. The processor is further operable to select one or more of the plurality of sensors to perform a respective task associated with the respective mission. The processor may also schedule the respective task to be performed by the selected one or more sensors. The scheduling is based at least on a task value that is determined based on an options pricing model. The options pricing model is based at least on the importance of the respective task to the success of the respective mission and one or more scheduling demands.

20 Claims, 3 Drawing Sheets

SYSTEM AND METHOD FOR SENSOR SCHEDULING USING FUZZY COGNITIVE MAPS

GOVERNMENT RIGHTS

This invention was made with Government support under NRO-000-06-C-0071 awarded by the National Reconnaissance Office (NRO). The Government may have certain rights in this invention.

TECHNICAL FIELD

This disclosure relates in general to satellite systems and more particularly to a system and method for sensor scheduling.

BACKGROUND

Intelligence, surveillance, and reconnaissance (ISR) operations generally include gathering information regarding a target and using the information to assist combat operations. To facilitate the gathering of information, ISR missions typically employ surveillance satellites having various sensors that collect data associated with the target. Given that ISR missions may occur in various remote locations, each having unique geographic and environmental attributes, the surveillance satellites may utilize multiple sensors. The sensors may perform tasks associated with an ISR mission such as target surveillance, locating a target, and data acquisition. Because a sensor may be unable to perform more than a single task at a time, efficient sensor scheduling and tasking may be critical to the success of an ISR mission.

SUMMARY OF THE DISCLOSURE

The present disclosure provides a system and method for sensor scheduling that substantially eliminates or reduces at least some of the disadvantages and problems associated with previous methods and systems.

According to one embodiment, a system for sensor scheduling includes a plurality of sensors operable to perform one or more tasks and a processor operable to receive one or more missions and one or more environmental conditions associated with a respective mission. Each mission may include one or more tasks to be performed by one or more of the plurality of sensors. The processor is further operable to select one or more of the plurality of sensors to perform a respective task associated with the respective mission. The processor may also schedule the respective task to be performed by the selected one or more sensors. The scheduling is based at least on a task value that is determined based at least on an options pricing model. The options pricing model is based at least on the importance of the respective task to the success of the respective mission and one or more scheduling demands.

In an embodiment, the value of the respective task is further based on a market-based auction. The market-based auction includes a plurality of bids. Each of the plurality of bids is at least a function of a predicted effectiveness of a particular sensor of the plurality of sensors for performing the respective task, the availability of the particular sensor to perform the respective task, and the importance of the respective task to the success of the respective mission.

Technical advantages of certain embodiments of the present disclosure may include combining fuzzy logic with real option theory to provide robust and flexible sensor task valuation and scheduling. In particular, the disclosed sensor scheduling system and method may account for risk and uncertainty in a dynamic intelligence, surveillance, and reconnaissance (ISR) mission environment. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
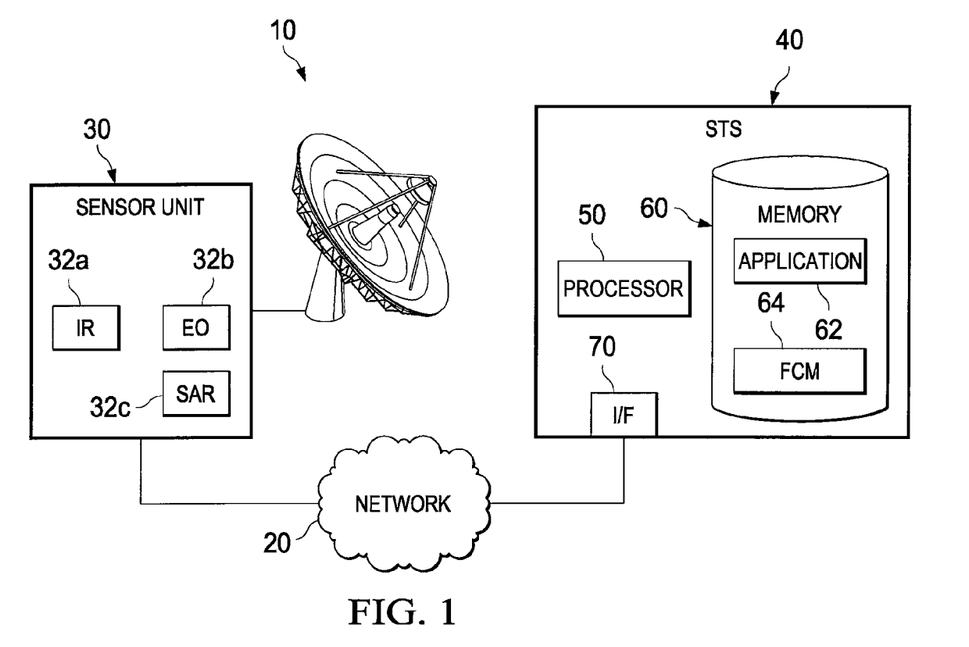
FIG. 1 is a simplified block diagram of an intelligence, surveillance, and reconnaissance (ISR) system 10 in accordance with a particular embodiment.

FIG. 1 is a simplified block diagram of an intelligence, surveillance, and reconnaissance (ISR) system 10 in accordance with a particular embodiment. ISR system 10 includes communication network 20, sensor unit 30, and sensor tasking system (STS) 40. In the illustrated embodiment, sensor unit 30 includes a plurality of sensors 32a-32c that may, among other things, analyze, generate, and record data for one or more tasks associated with an ISR mission. Such tasks may include locating a target, observing a target, and/or acquiring data and other information associated with a target. Although the following disclosure may be detailed with respect to ISR missions, the scope of the disclosure should encompass any sensor tasking operation.

In accordance with certain embodiments, STS 40 may select and schedule sensors 32 to perform various tasks associated with an ISR mission. Efficient sensor tasking and scheduling may be advantageous to the success of one or more ISR missions. In particular, because ISR missions may occur in a myriad of locations, each having unique topographies, weather patterns, and other environmental attributes, certain operations associated with an ISR mission may require, or at least be better serviced by, a particular sensor 32. Additionally, given the dynamic and uncertain environments where ISR missions may occur, an optimal sensor 32 at one time may not be best suited to perform a task at a later time. Further, a particular task may have greater importance in regards to the success of a particular ISR mission than another task. Likewise, a particular ISR mission may be more important relative to one or more other ISR missions. Thus, there may be a need to prioritize various tasks with respect to sensor selection and scheduling. To accommodate the multiple demands associated with sensor tasking and scheduling STS 40 may provide and enforce proactive sensor tasking and scheduling policies. Such policies may include various techniques for modeling an ISR mission environment in addition to assessing the value of ISR mission tasks. The subsequent disclosure will provide greater detail regarding the functionality of ISR system 10 and STS 40.

Communication network 20 provides connectivity between components coupled to communication network 20 using any appropriate communication protocol. In general, communication network 20 may represent any combination of public or private communication equipment such as elements of a public switched telephone network (PSTN), a global computer network such as the Internet, a local area network (LAN), a wide-area network (WAN), or other appropriate communication equipment. Communication network 20 may include any hardware and/or software configured to communicate information in the form of packets, cells, frames, segments or other portions of data. Communication network 20 may also include routers, hubs, switches, gateways, call controllers, and/or any other suitable components in any suitable form or arrangement. Although communication network 20 is illustrated as a single network, communication network 20 may comprise any number or configuration of networks. Moreover, certain embodiments of ISR system 10 may include any number or configuration of communication networks 20.

Sensor unit 30 may represent any suitable combination of hardware, software, and controlling logic operable to support an ISR operation. As illustrated in FIG. 1, sensor unit 30 is a satellite, however, in other embodiments, sensor unit 30 may be an unmanned aerial vehicle (UAV), surveillance aircraft or other reconnaissance vehicle or device. In operation, sensor unit 30 may receive commands from STS 40 and locally control the operation of sensors 32a-32c. Additionally, sensor unit 30 may organize data and other information collected by sensors 32a-32c and transmit the data to STS 30 for processing.

Sensors 32a-32c may be any acoustic, optical, mechanical, electronic, thermal, or electromagnetic device operable to sense or otherwise recognize variations in an ISR mission environment. In the illustrated embodiment, sensor 32a represents an infrared (IR) sensor, sensor 32b may be an electro-optical (EO) sensor, and sensor 32c may be synthetic aperture radar (SAR). Although specific examples of sensors 32a-32c are provided, sensors 32a-32c may be any sensing device.

STS 40 represents any suitable collection of hardware, software, and controlling logic operable to schedule and task sensors 32 for ISR missions. The functionality associated with STS 40 may be provided by processor 50, memory 60, and interface 70. In certain embodiments, STS 40 may include additional, alternate, or fewer components.

Processor 50 may represent any suitable device(s) capable of processing and/or communicating electronic information. Examples of processor 50 include, but are not limited to, application-specific integrated circuits (ASICs), field-programmable gate arrays (FGPAs), digital signal processors (DSPs), and any other suitable specific or general purpose processors. In operation, processor 50 may execute code containing commands and instructions to perform any of the operations described with respect to STS 40.

Memory 60 may store processor instructions and/or any other appropriate information used by STS 40. In particular, memory 60 may include any collection and arrangement of volatile or non-volatile, local or remote devices suitable for storing data. In the illustrated embodiment, memory 60 may store application 62 and fuzzy cognitive map ("FCM") 64. Application 62 may be a sensor tasking and scheduling process that may be executed by processor 50. As will be described in greater detail below, FCM 64 may be a data model used by STS 40 for sensor scheduling and tasking. Examples of memory 60 include, but are not limited to, random access memory (RAM) devices, dynamic random access memory (DRAM), read only memory (ROM) devices, magnetic storage devices, optical storage devices, flash memory, or any other suitable data storage devices.

Interface 70 may represent a communication gateway that includes transmit/receive circuitry for communicating with communication network 20 and components coupled to communication network 20 including sensor unit 30. Interface 46 may be operable to receive information and other data associated with an ISR mission.

Figure 2:
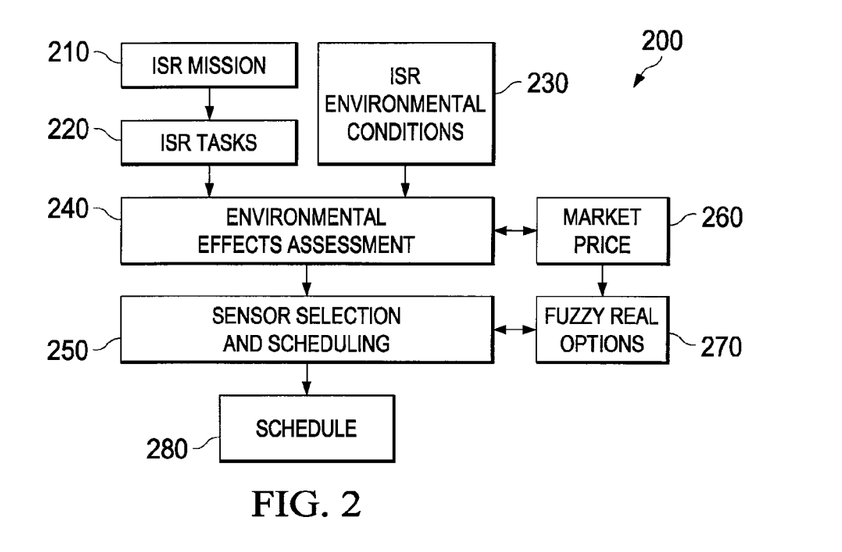
FIG. 2 is a flowchart illustrating an example sensor tasking and scheduling process for an ISR mission.

With reference to FIG. 2, a flowchart 200 illustrating an example sensor tasking and scheduling process for an ISR mission is provided. Flowchart 200 may represent a process performed by STS 40 upon execution of application 62 by processor 50. Although the operations will be described as being performed by STS 40, portions of the sensor tasking and scheduling process may be performed by any suitable component or combination of components associated with ISR system 10 of FIG. 1.

Sensor scheduling and tasking may begin with STS 40 receiving an ISR mission at block 210. The ISR mission may be generated by a user of STS 40 such as a mission commander. An ISR mission may include relevant mission details and data such as, for example, an area of interest (AOI), a target, ISR objectives, and scheduling parameters. An AOI may generally be a location used to focus a mission to a given geographic region. AOIs may be defined as a circular region on the surface of the earth. Defining an AOI as a circle may allow STS 40 to implement approximations of AOI intersections used to determine ISR environmental conditions such as weather, sun visibility and look angle(s), and target visibility and look angle(s). A target may be a location associated with an area of interest (AOI). For example, a target may be an enemy base, aircraft, ship, land mine, or any other specific or general location within an AOI. In addition to designating a target, a user may also specify target attributes which may be relevant to sensor scheduling and tasking. Target attributes may include details regarding a target such as height, scene type (e.g., airborne, land, water), size, speed, expected visibility, and expected target energy. ISR objectives may include task goals for a particular target or mission. In particular, ISR objectives may include terrain mapping, static target detection, moving target indication, target tracking, target recognition, and target identification. The ISR objectives may also include a mission demand belief which may be a subjective value that corresponds to the relative importance of the task to the success of an ISR mission. Given the dynamic nature of ISR missions, AOIs, targets, and ISR objectives may be created, modified, and/or deleted.

Based on the AOI, target, and ISR objectives, STS 40 may create one or more tasks associated with the ISR mission at block 220. As mentioned, a task may be a job or other assignment that is to be performed by one or more sensors 32. Thus, for example, if the ISR mission is to determine the location of a potential target, then a task may be to generate images of an AOI designated in the ISR mission. In certain embodiments, the tasks may be input by a user of STS 40. Accordingly, STS 40 may create mission specific tasks based on a particular ISR mission and/or may receive one or more tasks directly from a user.

At block 230, STS 40 may receive various ISR mission environmental conditions. More particularly, the ISR mission environment may be surveyed to obtain relevant data for performing an environmental effects assessment. An environmental effects assessment may include modeling an ISR mission environment and determining what, if any, effects ISR mission variables have on sensor tasking and scheduling. Surveying the ISR mission environment may include obtaining ISR environmental conditions such as weather and terrain data for an AOI associated with the ISR mission. Weather conditions may be obtained from any suitable weather forecasting device or agency including Fleet Numerical Meteorology and Oceanography Center (FNMOS), International Civil Aviation Organization (ICAO), Terminal Aerodome Forecast (TAF), and Meteorological Aerodrome Report (METAR). Relevant weather data may include cloud cover (cloud type, density, and height), wind speed and direction, visibility, temperature, barometric pressure, and dew point. Terrain conditions may be obtained from a topographical map or database and include target/AOI altitude, foliage density, and topography details such as landscape, waterscape, and ground cover data.

Once the ISR environmental conditions are obtained, STS 40 may perform an environmental effects assessment at block 240. According to a particular embodiment, the environmental effects assessment may utilize a fuzzy cognitive map (FCM). A FCM may generally be a signed directed graph that describes and models a system using fuzzy logic. Fuzzy logic is a data set theorem that allows partial set membership as opposed to crisp set membership or non-membership. Generally, a FCM may consist of nodes and weighted links that indicate causal relationships between nodes. The nodes in a FCM may be input nodes or concept nodes. Input nodes may include measurements or other suitable system data which have a fixed value at the beginning of a designated period. By contrast, concept nodes represent general events, goals, values, or trends of the modeled system that have values which change until the FCM stabilizes. The values associated with the nodes in a FCM are fuzzy, and thus represent the degree of membership within a particular set (or concept). The weighted links which connect concept nodes indicate the relative influence one concept has on another concept. If a weighted link connecting two nodes is positive, then the increase in the value of the first node increases the value of the second node. By contrast, if a weighted link connecting two nodes is negative, then an increase in the value of the first node causes a decrease in the value of the second node and vice versa. Once an FCM is assembled, it may be used to model and simulate the behavior of a system by adjusting the respective values of the concept nodes and weighted links in response to input variations. Accordingly, a FCM may provide a mathematical model which may be used to determine how changes in various inputs influence a system.

Figure 3:
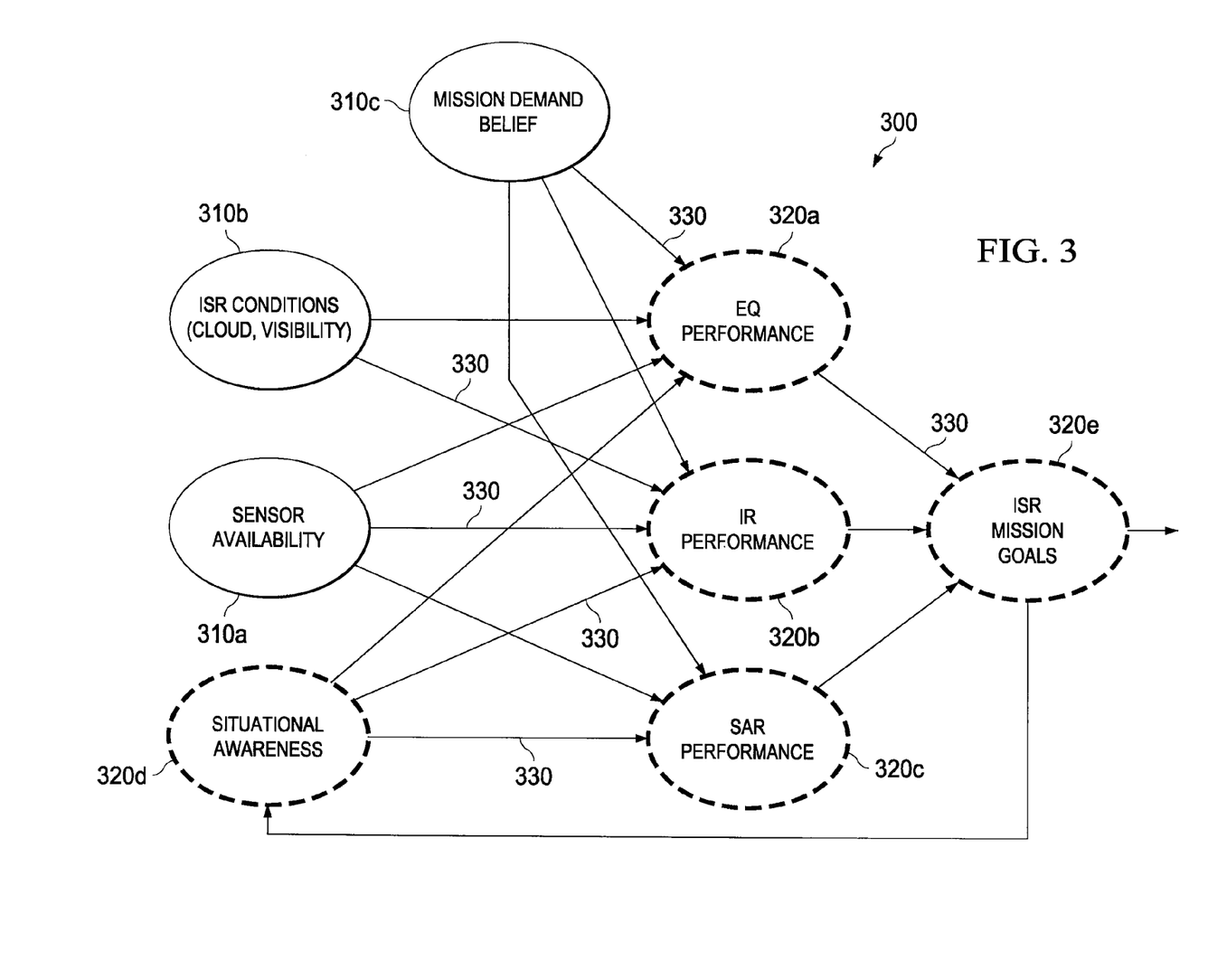
FIG. 3 is a fuzzy cognitive map for an ISR environmental effects assessment in accordance with an embodiment.

FIG. 3 provides an example FCM 300 for an ISR environmental effects assessment. In an embodiment, FCM 300 may be generated by processor 50 and stored in memory 60 as FCM 64 (illustrated in FIG. 1). FCM 300 includes input nodes 310a-310c, concept nodes 320a-320e, and weighted links 330. Input nodes 310 generally represent nodes having a fixed value at the beginning of an ISR scheduling period such as measurements or other data relating to ISR environmental conditions and/or mission objectives.

In the illustrated embodiment, input nodes 310a-310c correspond to sensor availability, ISR conditions, and mission demand belief, respectively. Sensor availability input node 310a may indicate whether a particular sensor 32 associated with sensor unit 30 (illustrated in FIG. 1) is available to perform a particular task. ISR conditions input node 310b may generally include data relating to uncontrollable factors Accordingly, input node 310b may include any of the environmental conditions obtained from surveying the ISR environment such as sun visibility, cloudiness, time of day, weather, and geographic data including land scene, water scene. In certain embodiments, ISR conditions input node 310b may also include data regarding target visibility, target size, target location, and/or target speed. Mission demand belief may be a semi-controllable factor which represents the importance of a tasking request relative to the success of an overall ISR mission.

Concept nodes 320a-320e correspond to EO sensor performance, IR sensor performance, SAR sensor performance, situational awareness information, and ISR mission goals, respectively. Situational awareness information may relate to the level of necessary knowledge that is required with respect to a target, ISR mission environment, and/or enemy intent to achieve the expected level of success for an ISR mission. IR, EO, and SAR sensor performance concept nodes 320a-320c may relate to the capabilities and functionality associated with IR sensor 32a, EO sensor 32b, and SAR sensor 32c, respectively. ISR mission goal concept node 320e represents an output node whose causal weight(s) may be used as constraints in sensor tasking and scheduling.

With respect to an ISR mission, FCM 300 may allow STS 40 to efficiently assess the causal relationships between ISR environmental conditions and ISR mission objectives to determine an optimal sensor for performing a particular ISR mission task. Further, FCM 300 may dynamically update to provide an accurate representation of an ISR environment in response to variations in environmental conditions and mission objectives. Accordingly, FCM 300 may facilitate the proactive sensor selection and tasking functionality associated with STS 40.

Returning now to FIG. 2, after performing an environmental effects assessment, STS 40 may select and schedule one or more sensors 32 to perform a task at block 250. Sensor selection may be based on the output of FCM 300. As an example, assume that a particular task is to locate a target in a cloudy ISR mission environment having dense foliage. In such a situation, an EO sensor or IR sensor may be ineffective for performing the respective task. Because fuzzy logic allows for partial set membership and non-membership, FCM 300 may indicate the degree to which the cloud and foliage densities may influence the effectiveness of the EO sensor and/or IR sensor in performing the designated task. Accordingly, an FCM may allow STS 40 to select one or more optimal sensors for performing an ISR mission task.

After selecting one or more sensors to perform a particular task, STS 40 may build an ISR mission task queue for scheduling. A task queue may contain tasks associated with multiple ISR missions to be performed by one or more sensors 32 of sensor unit 30. In an embodiment, there may be a separate task queue for each sensor scheduling period. The tasks in a queue may be ordered and/or ranked according to a relative value associated with each task. Tasks with a higher value may be performed first, while tasks with a lower value may be performed later or not at all. Depending on the demands of a particular ISR mission, the value of a task may be determined subjectively by a user of STS 40, or objectively using any suitable algorithm. In certain embodiments, the value of a task for purposes of rank in a task queue may be different than the mission demand belief used for the ISR environmental effects assessment. In particular, mission demand belief may generally relate to the importance of a task for a particular ISR mission, whereas the value of a task for purposes of a task queue may indicate the importance of a task in relation to multiple ISR missions.

Embodiments of ISR system 10 may employ various methods for determining the value of a particular sensor task. According to the sensor tasking and scheduling process illustrated in FIG. 2, the value of a sensor task may be determined by a market-based auction approach at block 260 and/or a fuzzy real options approach at block 270. As will be discussed in greater detail, the fuzzy real options approach may be based in part on a market price determined by the market-based auction at block 260.

At block 260, the market price of a sensor task may be determined using a market-based auction. The market price may indicate the relative value of a sensor task based on one or more auction bids. During the course of an auction, bids may be adjusted to account for variations in ISR environmental conditions and ISR mission goals as well as the scheduling of new sensor tasks. The auction may continuously run for the duration of a sensor tasking and scheduling period until a predetermined time prior to the performance of the task.

To facilitate a market-based auction, STS 40 may initially rank candidate sensors 32 for performing a task. Each candidate sensor in the auction may be analogous to a market for task consumption and the initial ranking may be based on an output of FCM 300. In particular, the ranking may be based on the relative effectiveness of the sensors 32 given the ISR mission environment and objectives. After candidate sensors 32 are ranked, bids may be submitted. In general, bids may be solicited and/or submitted at three times: 1) when STS 40 solicits a bid; 2) when a bid for a new task is solicited and the task conflicts with a task currently in auction; and 3) when an auction closes and the demand for a particular time interval decreases. A "bid" may be a function of the predicted effectiveness of a particular sensor 32 in performing a task, the availability of a sensor (i.e. whether the sensor is scheduled to perform another task), and the priority of the task. Thus, even though a particular sensor 32 may be best suited to perform a particular task, a low bid may be submitted for the sensor if, for example, it is already scheduled to perform another task. In an embodiment, the predicted effectiveness may be determined using the output of FCM 300 in FIG. 3 and the priority of the task may be based on the mission demand belief which may be an initial ISR mission that is received at block 210.

At any time prior to the performance of a task, STS 40 may determine the "market price" for a particular task. The market price may be a function of one or more bids. In particular, the market price may be an average of multiple bids, the highest bid, the lowest bid, or any other value based on the predicted effectiveness of a sensor 32 and the priority of a task. The actual market price may be calculated using a sigmoid function ranging from one thousand to ten thousand units.

In an embodiment, the market price may be directly used to schedule a sensor task. In particular, the market price may be used to rank tasks in the described sensor tasking queue for scheduling. Accordingly, a sensor task having the highest market price for a given sensor scheduling period may receive the highest ranking. This task may be selected for scheduling and placed on a sensor task schedule at block 280.

As mentioned, the value of a sensor task may also be determined using a fuzzy real options approach (block 270). The fuzzy real options approach may combine real options theory with fuzzy logic to determine the value of a particular sensor task. Generally, a real option is the possibility, for a certain period of time, to either choose for or against the occurrence of an event without binding oneself up front. Real options are based on the same principles as financial options, however, real options involve assets that are physical/tangible as opposed to purely financial. Incorporating real options theory into sensor task valuation may facilitate optimal sensor task scheduling by accounting for uncertainty in sensor selection. Like an investment, sensor tasking and scheduling involves decisions regarding costs, resources, and the extraction of value. Additionally, as with an investment, sensor tasking and scheduling involves uncertainty, cost, and the utilization of various resources. Thus, the scheduling of a sensor task may involve selecting certain options while foregoing others. Such options may include whether to abandon a task (put), delay a task, and/or schedule a task (call). Accordingly, real options theory may offer a robust method for sensor task valuation and scheduling by considering the time-value of a dynamic task and the risk involved in the selection of an option for the requested task.

In general, the price of a real option depends on the present value of expected cash flows, the value of fixed costs, the risk-free rate of return, time to maturity of the option, uncertainty of expected cash flows, and any value lost over the duration of the option. The Black-Scholes model is one method for calculating the price, or value, of a real option. According to the Black-Scholes formula, the value of a real option (ROV) is:

$$ROV = S_0 e^{-\lambda T} N(d_1) - X e^{-rT} N(d_2)$$

$$d_1 = \frac{\ln\left(\frac{S_0}{X}\right) + \left(r - \delta + \frac{\sigma^2}{2}\right)}{\sigma \sqrt{T}}$$

$$d_2 = d_1 - \sigma \sqrt{T}$$

where $S_0$ is the present value of expected cash flows, $N(x)$ is the cumulative standard normal distribution function, X is the nominal value of fixed costs or strike price, r is the risk-free interest rate, T is the time to maturity of the option, $\sigma$ is the uncertainty of expected cash flows, and $\lambda$ is the value lost over the duration of the option. Because expected cash flows are speculative, they are inherently uncertain and thus must be estimated. One means to estimate the present value of expected cash flows is to use fuzzy logic. As previously mentioned, fuzzy logic is a data set theorem which allows partial set membership as opposed to crisp set membership or non-membership. Thus, fuzzy logic may provide a useful model for estimating the value of expected cash flows. Similarly, the expected costs and variance of the present value of expected cash flows may be estimated by employing fuzzy set logic.

According to the fuzzy real options approach, the value of a task may be equivalent to the "strike price" of an option. The strike price for a real option represents the price at which the owner of the option may purchase the underlying asset. In an embodiment, the strike price may be determined using a FCM which models the Black-Scholes pricing formula. In particular, ISR mission variables may be substituted for the traditional financial variables associated with the Black-Scholes pricing model and fuzzy logic may be used to account for pricing uncertainty. The FCM may provide a strike price for a task which may be used to decide whether a particular task is placed on a schedule, delayed, or discarded.

Figure 4:
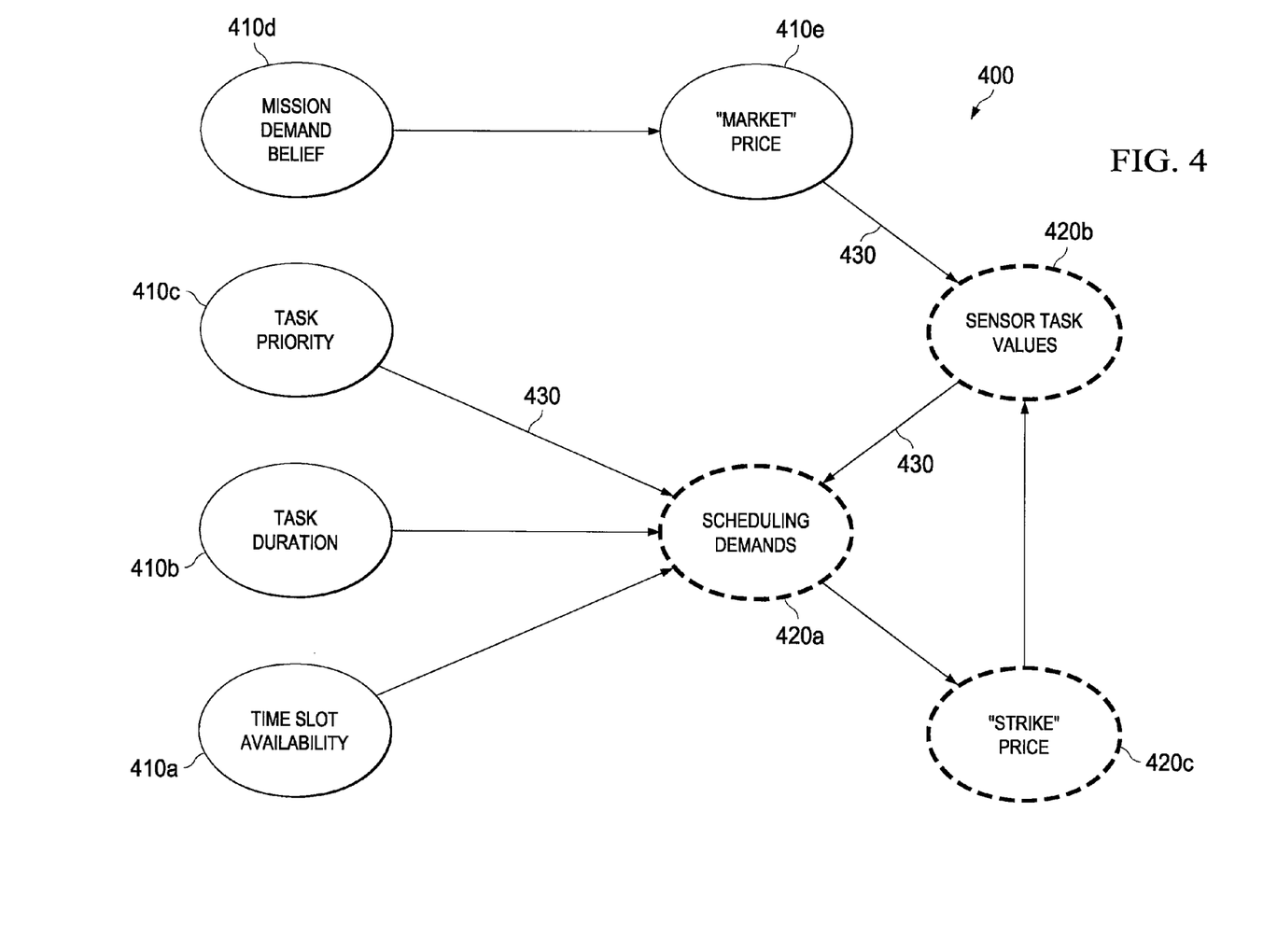
FIG. 4 is a fuzzy cognitive map for assessing scheduling effects on a sensor task strike price in accordance with a particular embodiment.

FIG. 4 illustrates an example FCM 400 for assessing scheduling effects on a task strike price. FCM 400 may be generated by processor 50 and stored as FCM 64 in memory 60 of FIG. 1. In the illustrated embodiment, FCM 400 includes input nodes 410a-410e, concept nodes 420a-420c, and weighted links 430. Input nodes 410a-410c correspond to task priority, task duration, and time slot availability, respectively. Time slot availability input node 410a may correspond to whether a particular sensor 32 or sensor unit 30 is scheduled for another task. In particular, input node 410a may indicate the relative availability of a particular sensor over a particular scheduling period. Task duration input node 410b may relate to the anticipated length of a particular task. Task priority input node 410c may correspond to the relative importance that a task is scheduled at a particular time. In certain embodiments, task priority input node 410c may be associated with a mission demand belief. Input nodes 410d and 410e correspond to mission demand belief and market price, respectively. Mission demand belief may be the same input that was used in the previously described sensor selection process. Market price input node 410e may be based on the output of the previously described market-based auction in addition to mission demand belief input node 410d. Scheduling demands concept node 420a may be a weighted combination of input nodes 410a-410c. In terms of real option theory, scheduling demands concept node 420a may model the investment cost. Sensor task value concept node 420b may represent the value of a sensor task option as may be determined using any suitable real options pricing theory.

After FCM 400 stabilizes, the value of strike price concept node 420c may be used for sensor task scheduling at block 250. In particular, the strike price of one or more tasks may be used to rank the tasks in the previously described sensor tasking queue. The relative priority of a task in the queue may determine whether a "put" or a "call" is placed on the task. A put indicates that a sensor task is to be discarder and/or delayed. By contrast, a call indicates that a sensor is to be placed on a schedule. A call may be placed on the task(s) with the highest rankings, whereas a put may be placed on each of the other tasks in the queue. If a call is placed on a task, then it may be included on a sensor schedule for performance at block 280.

As mentioned, a task that is placed on a sensor schedule for performance at block 280 may be the task with the highest rank in a particular task queue. However, that task may or may not be performed. This is because the disclosed sensor tasking and scheduling process may be dynamic and thus account for variations in ISR environmental conditions as well as the scheduling of new tasks. As an example, the ISR environmental conditions for a particular task may change between when it is placed on a sensor schedule and when it is to be performed. The fluctuation in the ISR environmental conditions for the task may make the task more or less valuable as determined by one of the disclosed approaches. Correspondingly, a sensor task having a lower value may become more valuable with respect to scheduling rank. As another example, a new ISR mission may be scheduled which has one or more valuable tasks which may take the place of a previously scheduled task in a task queue. Thus, the disclosed sensor tasking and scheduling system may dynamically adjust scheduling and tasking parameters in response to variations in one or more ISR missions.

Modifications, additions, or omissions may be made to ISR system 10 and the described components. For instance, functionality described as being associated with STS 40 may be distributed among various components of ISR system 10. Further, while various ISR environmental conditions, scheduling parameters, and ISR objectives have been described in detail, other variables may be used in the described sensor tasking and scheduling procedure. Additionally, although certain embodiments have been described in detail numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A system for sensor scheduling comprising:
a plurality of sensors operable to perform one or more tasks;
a processor operable to:
receive one or more missions, wherein each mission comprises an area of interest and one or more tasks to be performed by one or more of the plurality of sensors;
receive one or more environmental conditions associated with a respective mission of the one or more missions, the one or more environmental conditions comprising weather and terrain data for the area of interest of the respective mission;
select, for a respective task of the one or more tasks associated with the respective mission of the one or more missions, one or more of the plurality of sensors to perform the respective task, the selecting based on an output of a fuzzy cognitive map, the fuzzy cognitive map including nodes and weighted links, the nodes and weighted links indicating causal relationships between the one or more environmental conditions and the respective mission, wherein at least one of the nodes is associated with a market-based auction; and
schedule the respective task to be performed by the selected one or more sensors, wherein:
the scheduling is based at least on a value associated with the respective task;
the value associated with the respective task is determined based at least on an options pricing model; and
wherein the options pricing model is based at least on the importance of the respective task to the success of the respective mission and one or more scheduling demands.

2. The system of claim 1, wherein the scheduling demands include the duration of the respective task, and the availability of a sensor to perform the respective task at a particular time.

3. The system of claim 1, wherein the processor is further operable to generate the fuzzy cognitive map, the nodes of the fuzzy cognitive map comprising a plurality of input nodes, and concept nodes, wherein the plurality of input and concept nodes are associated with the one or more scheduling demands, each input node corresponds to data that has a fixed value at a beginning of a scheduling period, and each concept node corresponds to data that has a value that may change until the fuzzy cognitive map stabilizes.

4. The system of claim 3, wherein the value of the respective task is further based on Real Options Theory and the market-based auction, and wherein the market-based auction comprises a plurality of bids, wherein each of the plurality of bids is at least a function of:
a predicted effectiveness of a particular sensor of the plurality of sensors for performing the respective task;
the availability of the particular sensor to perform the respective task; and
the importance of the respective task to the success of the respective mission.

5. The system of claim 4, wherein at least one of the plurality of input and concept nodes of the fuzzy cognitive map is associated with the market-based auction.

6. The system of claim 3, wherein the value of the respective task is further based on an output of the fuzzy cognitive map.

7. The system of claim 3, wherein the processor is further operable to rank the respective task based on the value of the respective task, wherein the rank determines a priority for scheduling.

8. The system of claim 1, wherein the real options pricing model is based at least on the value of scheduling the respective task for performance by the one or more selected sensors and the value of scheduling a different task for performance by the one or more selected sensors.

9. The system of claim 1, wherein a processor operable to schedule the respective task to be performed by the selected one or more sensors comprises a processor operable to:
include the respective task on a sensor schedule;
delay the performance of the respective task; and
abandon the respective task from the sensor schedule.

10. The system of claim 1, wherein the area of interest includes a target, and one of the one or more tasks is to determine an attribute of the target, and wherein the processor is further operable to determine the one or more tasks to be performed by one or more of the plurality of sensors from the one or more missions.

11. A computerized method for sensor scheduling: receiving one or more tasks at a computer, wherein the one or more tasks is to be performed by one or more sensors of a plurality of sensors, wherein the one or more tasks is associated with a mission of one or more missions, and wherein the mission of the one or more missions comprises an area of interest;
receiving one or more environmental conditions associated with the mission, the one or more environmental conditions comprising weather and terrain data for the area of interest;
selecting, by the computer, one or more sensors of the plurality of sensors to perform a task of the one or more tasks, the selecting based on an output of a fuzzy cognitive map, the fuzzy cognitive map including nodes and weighted links, the nodes and weighted links indicating causal relationships between one or more environmental conditions and the mission, wherein at least one of the nodes is associated with a market-based auction; and
scheduling, by the computer, the one or more selected sensors to perform the task, the scheduling based at least on a value associated with the task, wherein the value associated with the task is determined based at least on an options pricing model, and wherein the options pricing model is based at least on the importance of the task to the success of the mission and one or more scheduling demands.

12. The method of claim 11, wherein the options pricing model is based on the value of scheduling the task to be performed by the selected sensor and the value of scheduling a different task to be performed by the selected sensor.

13. The method of claim 11, wherein the real options pricing model is represented using, in part, variables from the fuzzy cognitive map as inputs in a Black-Scholes model.

14. The method of claim 11, wherein scheduling the at least one selected sensor to perform the task comprises at least one of:
including the task on a sensor schedule;
delaying the performance of the task; and
abandoning the task.

15. The method of claim 11, further comprising ranking the task based on the value of the respective task, wherein the ranking determines a priority for scheduling.

16. Logic embodied in a tangible computer readable medium, the tangible computer readable medium comprising code operable when executed on a processor, to:
receive one or more missions, wherein each mission comprises an area of interest and one or more tasks to be performed by one or more of a plurality of sensors;
receive one or more environmental conditions associated with a respective mission of the one or more missions, the one or more environmental conditions comprising weather and terrain data for the area of interest of the respective mission;
select, for a respective task of the one or more tasks associated with the respective mission of the one or more missions, one or more of the plurality of sensors to perform the respective task, the selecting based on an output of a fuzzy cognitive map, the fuzzy cognitive map including nodes and weighted links, the nodes and weighted links indicating causal relationships between the one or more environmental conditions and the respective mission, wherein at least one of the nodes is associated with a market-based auction; and
schedule the respective task to be performed by the selected one or more sensors, wherein:
the scheduling is based at least on a value associated with the respective task;
the value associated with the respective task is determined based at least on an options pricing model; and
wherein the options pricing model is based at least on the importance of the respective task to the success of the respective mission and one or more scheduling demands.

17. The logic of claim 16, wherein the code is further operable to generate the fuzzy cognitive map, and wherein the nodes comprise a plurality of nodes, wherein the plurality of nodes are associated with the one or more scheduling demands.

18. The logic of claim 16, wherein the value of the respective task is further based on the market-based auction, and wherein the market-based auction comprises a plurality of bids, wherein each of the plurality of bids is at least a function of:
a predicted effectiveness of a particular sensor of the plurality of sensors for performing the respective task;
the availability of the particular sensor to perform the respective task; and
the importance of the respective task to the success of the respective mission.

19. The logic of claim 16, wherein the code is further operable to rank the respective task based on the value of the respective task, wherein the rank determines a priority for scheduling.

20. The logic of claim 16, wherein code operable to schedule the respective task to be performed by the selected one or more sensors comprises code operable to:
include the respective task on a sensor schedule;
delay the performance of the respective task; and
abandon the respective task from the sensor schedule.

* * * * *

UNITED STATES PATENT AND TRADEMARK OFFICE
CERTIFICATE OF CORRECTION

| | | |
|---|---|---|
| PATENT NO. | : 8,201,181 B2 | Page 1 of 1 |
| APPLICATION NO. | : 11/849016 | |
| DATED | : June 12, 2012 | |
| INVENTOR(S) | : Nguyen et al. | |

It is certified that error appears in the above-identified patent and that said Letters Patent is hereby corrected as shown below:

ON THE TITLE PAGE:

Item (56) References Cited under "Other Publications", in column 1, line 33, delete "al,", and insert -- al., --, therefor Item (56) References Cited under "Other Publications", in column 1, line 35, delete "Century'.,", and insert -- Century', --, therefor Item (56) References Cited under "Other Publications", in column 2, line 15, after "41-49.", insert -- ¶ --, therefor Item (56) References Cited under "Other Publications", in column 2, line 15, delete "al;", and insert -- al., --, therefor

IN THE CLAIMS:

In column 11, line 23, in Claim 11, after "scheduling:", insert -- scheduling comprising: --, therefor Signed and Sealed this
Ninth Day of October, 2012

David J. Kappos
*Director of the United States Patent and Trademark Office*